US010803317B2

(12) United States Patent
Eronen et al.

(10) Patent No.: US 10,803,317 B2
(45) Date of Patent: Oct. 13, 2020

(54) MEDIA RENDERING

(71) Applicant: Nokia Technologies Oy, Espoo (FI)

(72) Inventors: Antti Eronen, Tampere (FI); Francesco Cricri, Tampere (FI); Arto Lehtiniemi, Lempäälä (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 15/918,881

(22) Filed: Mar. 12, 2018

(65) Prior Publication Data
US 2018/0276476 A1    Sep. 27, 2018

(30) Foreign Application Priority Data

Mar. 21, 2017 (EP) .................................... 17162018

(51) Int. Cl.
G06K 9/00 (2006.01)
H04N 21/439 (2011.01)
G06T 19/00 (2011.01)
G02B 27/01 (2006.01)
H04R 1/10 (2006.01)

(52) U.S. Cl.
CPC ........ *G06K 9/00711* (2013.01); *G02B 27/017* (2013.01); *G06T 19/006* (2013.01); *H04N 21/4396* (2013.01); *H04R 1/1041* (2013.01); *G06K 2009/00738* (2013.01); *H04S 2400/11* (2013.01); *H04S 2420/01* (2013.01)

(58) Field of Classification Search
CPC ...... G06K 9/00711; G06K 2009/00738; G06T 19/006; H04R 1/1041; H04N 21/4396
USPC ...................................... 345/8, 633; 715/736
See application file for complete search history.

(56) References Cited

U.S. PATENT DOCUMENTS

| 6,011,851 A | 1/2000 | Connor et al. |
| 6,500,008 B1 * | 12/2002 | Ebersole ............ A62C 99/0081 345/441 |
| 7,539,606 B2 * | 5/2009 | Comair .................. G06T 13/60 345/419 |
| 9,372,251 B2 | 6/2016 | Soulodre |
| 9,378,467 B1 * | 6/2016 | Chaiyochlarb ..... G06F 3/04817 |
| 9,414,105 B2 * | 8/2016 | Rajapakse ........ H04N 21/41407 |
| 2001/0046304 A1 | 11/2001 | Rast ............................... 381/74 |

(Continued)

FOREIGN PATENT DOCUMENTS

| EP | 3255905 A1 | 12/2017 |
| WO | 2012/161751 A1 | 11/2012 |

OTHER PUBLICATIONS

"Sound Masking", Wikipedia, Retrieved on Mar. 1, 2018, Webpage available at: https://en.wikipedia.org/wiki/Sound_masking.
"Binaural Audio for Narrative VR", Oculus, Retrieved on Mar. 1, 2018, Webpage available at: https://www.oculus.com/story-studio/blog/binaural-audio-for-narrative-vr/.

(Continued)

*Primary Examiner* — Calvin C Ma
(74) *Attorney, Agent, or Firm* — Harrington & Smith

(57) ABSTRACT

A method comprising:
rendering a first media scene based upon media content provided by a content-rendering application via one or more rendering devices worn by the user;
determining a priority for an event that occurs near the user, the event being independent of the content-rendering application; and
automatically modifying the rendered first media scene, to render a modified second media scene based at least in part upon media content provided by the content-rendering application and at least in part upon other media content associated with the event.

20 Claims, 3 Drawing Sheets

(56) References Cited

U.S. PATENT DOCUMENTS

| | | | | |
|---|---|---|---|---|
| 2012/0306911 A1* | 12/2012 | Okazaki | ............. | G06Q 30/0251 |
| | | | | 345/625 |
| 2013/0269013 A1* | 10/2013 | Parry | ................. | H04L 63/0861 |
| | | | | 726/7 |
| 2013/0339864 A1* | 12/2013 | Uusitalo | ............... | H04W 48/18 |
| | | | | 715/736 |
| 2014/0063055 A1* | 3/2014 | Osterhout | ............... | G06F 3/005 |
| | | | | 345/633 |
| 2014/0282003 A1* | 9/2014 | Gruber | .................... | G06F 3/167 |
| | | | | 715/727 |
| 2016/0054565 A1 | 2/2016 | Izumihara et al. | | |
| 2016/0381450 A1 | 12/2016 | Taite et al. | | |

OTHER PUBLICATIONS

"Sound Event Detection", Tampere University of Technology, Retrieved on Mar. 1, 2018, Webpage available at : http://www.cs.tut.fi/~heittolt/research-sound-event-detection.

Shah et al., "Metrics for Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2, Jun. 1998, pp. 107-133.

Smith, "Towards a logic of innovation", The International Handbook on Innovation, Dec. 2005. p. 347-365.

Extended European Search Report received for corresponding European Patent Application No. 17162018.0, dated Aug. 31, 2017, 7 pages.

\* cited by examiner

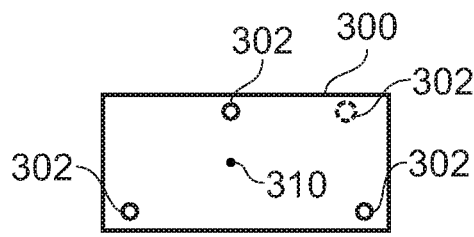
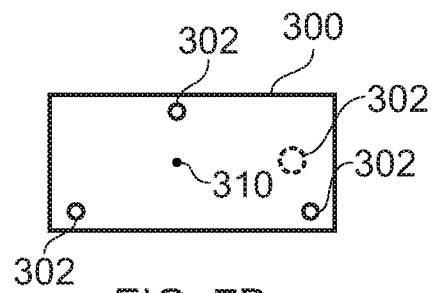
FIG. 7A　　　FIG. 7B
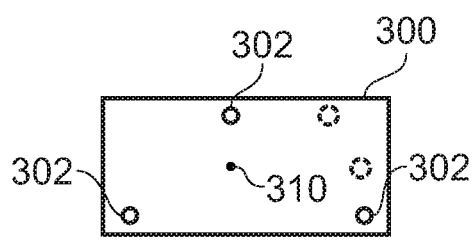
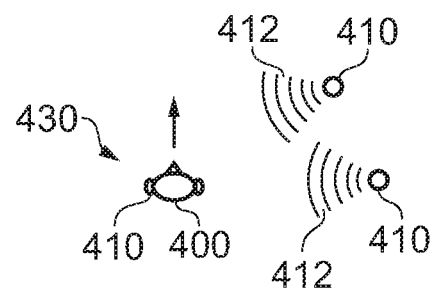
FIG. 8A　　　FIG. 8B
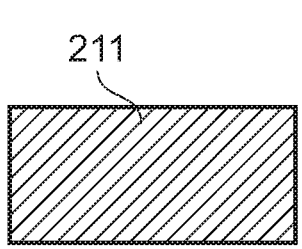
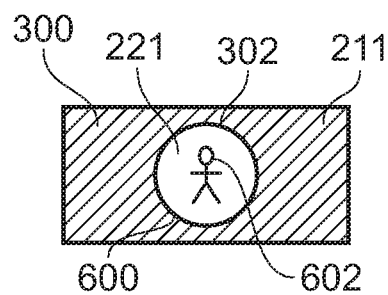
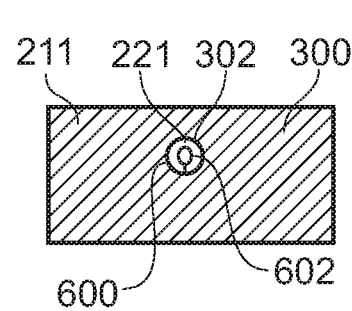
FIG. 9A　　　FIG. 9B　　　FIG. 9C
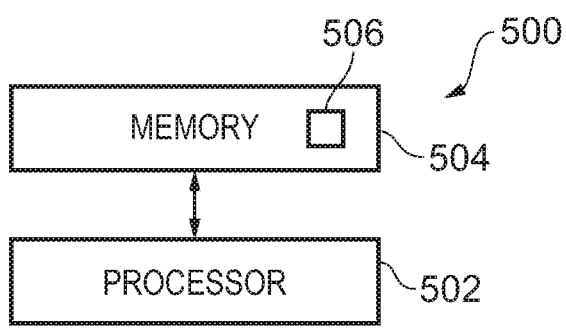
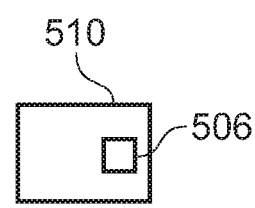
FIG. 10A　　　FIG. 10B

MEDIA RENDERING

TECHNOLOGICAL FIELD

Embodiments of the present invention relate to media rendering. In particular, they relate to rendering of media via virtual reality or augmented reality.

BACKGROUND

Spatial audio processing involves the localization of a sound object (a sound source) in a three dimensional space.

This may be achieved, for example, using loudspeaker panning. Vector Base Amplitude Panning (VBAP), for example, allows an arbitrary placement of loudspeakers.

For a person wearing headphones a sound object may be located at a three dimension position (e.g. at (r, ϑ, Φ) in spherical co-ordinates) by providing an appropriate input signal $x_L$ (t) to a left ear loudspeaker and an appropriate input signal $x_R$ (t) to a right ear loudspeaker.

The input signal $x_L$ (t) is produced by processing the audio signal x(t) using a first head related transfer HRTF (r', ϑ', Φ', L) for the left ear.

The input signal $x_R$ (t) is produced by processing the audio signal x(t) using a second head related transfer HRTF (r', ϑ', Φ', R) for the right ear.

The position of the sound object in a frame of reference of the sound space (r, ϑ, Φ) is mapped into a position of the sound object in a listener's frame of reference (r', ϑ', Φ'). The orientation of the listener's frame of reference is determined by the orientation of the listener's head. This allows a sound source to be correctly placed in the sound space while the listener moves his head.

For a person wearing a head mounted display a visual object may be located at a three dimension position (e.g. at (r, ϑ, Φ) in spherical co-ordinates). The position of the visual object in a frame of reference of the visual space (r, ϑ, Φ) is mapped into a position of the visual object in a viewer's frame of reference (r', ϑ', Φ'). The orientation of the viewer's frame of reference is determined by the orientation of the viewer's head. This allows a visual object to be correctly placed in the visual space while the viewer moves his head.

In some examples, a user may be a listener and a viewer. In other examples, a user may be a listener and not a viewer. In other examples, a user may be a viewer and not a listener.

BRIEF SUMMARY

According to various, but not necessarily all, embodiments of the invention there is provided a method comprising: rendering a first media scene based upon media content provided by a content-rendering application via one or more rendering devices worn by the user; determining a priority for an event that occurs near the user, the event being independent of the content-rendering application; and automatically modifying the rendered first media scene, to render a modified second media scene based at least in part upon media content provided by the content-rendering application and at least in part upon other media content associated with the event.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: determining a priority for an event, the event being independent of a content-rendering application that provides media content rendered in a first media scene; automatically determining to cause modification of the rendered first media scene, to render a modified second media scene based at least in part upon media content provided by the content-rendering application and at least in part upon other media content associated with the event.

According to various, but not necessarily all, embodiments of the invention there is provided an apparatus comprising: means for determining a priority for an event, the event being independent of a content-rendering application that provides media content rendered in a first media scene; means for automatically determining to cause modification of the rendered first media scene, to render a modified second media scene based at least in part upon media content provided by the content-rendering application and at least in part upon other media content associated with the event.

According to various, but not necessarily all, embodiments of the invention there is provided a computer program or computer program product, that when run on a processor enables: determining a priority for an event, the event being independent of a content-rendering application that provides media content rendered in a first media scene; automatically determining to cause modification of the rendered first media scene, to render a modified second media scene based at least in part upon media content provided by the content-rendering application and at least in part upon other media content associated with the event.

According to various, but not necessarily all, embodiments of the invention there is provided a method comprising: rendering a first sound scene based upon sound content provided by a content-rendering application; determining, at an alert application, a priority for an event, the event being independent of the content-rendering application, wherein if the event is of insufficient priority, determining to automatically continue to render the first sound scene based upon sound content provided by a content-rendering application and not based upon any sound content provided by the alert application; and if the event is of sufficient priority, determining to automatically modify the rendered first sound scene, to render a modified second sound scene based at least in part upon sound content provided by the content-rendering application and at least in part upon sound content provided by the alert application for alerting a user to the event.

According to various, but not necessarily all, embodiments of the invention there is provided a method comprising: rendering a first sound scene based upon sound content provided by a content-rendering application; automatically modifying the rendered first sound scene, to render a modified second sound scene based at least in part upon sound content provided by the content-rendering application and at least in part upon sound content provided by an alert application for alerting a user to an event that is independent of the content-rendering application, wherein a user continues to hear content provided by the content-rendering application and in addition hears content provided by the alert application as a sound object.

According to various, but not necessarily all, embodiments of the invention there is provided method comprising: rendering a first sound scene based upon sound content provided by a content-rendering application; automatically modifying the rendered first sound scene, to render a modified second sound scene based at least in part upon sound content provided by the content-rendering application and at least in part upon sound content provided by an alert application for alerting a user to an event that is independent of the content-rendering application, wherein when rendering the second scene maintains at least some sound objects of the first sound scene, as rendered in the first sound scene.

According to various, but not necessarily all, embodiments of the invention there is provided a method comprising: rendering a first sound scene based upon sound content provided by a content-rendering application; automatically modifying the rendered first sound scene, to render a modified second sound scene based at least in part upon sound content provided by the content-rendering application and at least in part upon sound content provided by an alert application for alerting a user to an event that is independent of the content-rendering application, wherein the modification of the rendered sound scene is context specific the context being dependent upon at least a classification of the event.

According to various, but not necessarily all, embodiments of the invention there is provided a method comprising: rendering a first sound scene based upon first time-evolving sound content provided by a content-rendering application; determining a priority for an event, the event being independent of the content-rendering application, wherein when the event is of insufficient priority continue to render the first sound scene based upon the first time-evolving sound content provided by the content-rendering application and not based upon any sound content associated with the event; and when the event is of sufficient priority automatically modifying the rendered sound scene, to render a modified second sound scene based at least in part upon the first time-evolving sound content provided by the content-rendering application and at least in part upon sound content associated with the event.

According to various, but not necessarily all, embodiments of the invention there is provided a method comprising: rendering a first sound scene based upon sound content provided by a content-rendering application; determining, at an alert application, a priority for multiple events, the events being independent of the content-rendering application, automatically modifying the rendered first sound scene, to render a modified second sound scene based at least in part upon sound content provided by the content-rendering application and at least in part upon sound content provided by the alert application for alerting a user to a first higher priority event but not a second lower priority event, then automatically modifying the rendered first sound scene, to render a modified second sound scene based at least in part upon sound content provided by the content-rendering application and at least in part upon sound content provided by the alert application for alerting a user to the second lower priority event but not the first higher priority event.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 7A and 7B illustrate examples of a modified media scene for multiple different contemporaneous events are rendered sequentially.

FIG. 8A illustrate an examples of a modified media scene for multiple different contemporaneous events are rendered simultaneously and which was caused by the local environment illustrated in FIG. 8B;

FIG. 9A illustrates an example in which the rendered media content provided by the content-rendering application comprises a visual scene rendered via virtual reality;

FIG. 9B and FIG. 9C illustrate the rendered visual scene of FIG. 9A after an event causes visual content associated with the event to be rendered as window; and FIG. 10A illustrates an example of a controller;

FIG. 10B illustrates an example of a computer program;

DEFINITIONS

Figure 1:
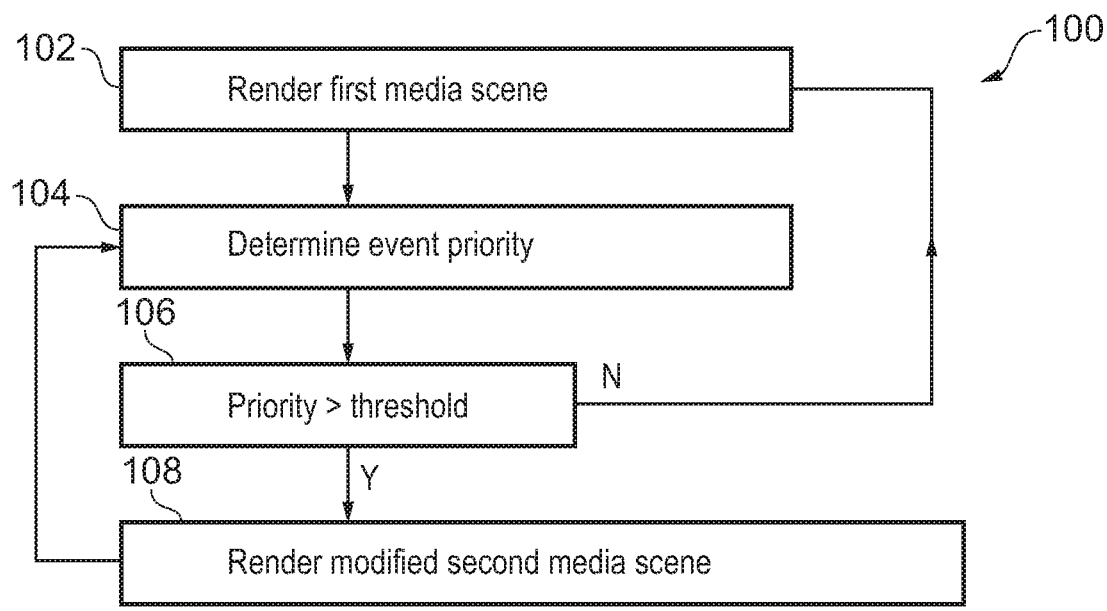
FIG. 1 illustrates an example of a method for controlling rendering of a media scene.

"artificial environment" may be something that has been recorded or generated.

"visual space" refers to fully or partially artificial environment that may be viewed, which may be three dimensional.

"visual scene" refers to a representation of the visual space viewed from a particular point of view within the visual space.

'visual object' is a visible object within a virtual visual scene.

"sound space" refers to an arrangement of sound sources in a three-dimensional space. A sound space may be defined in relation to recording sounds (a recorded sound space) and in relation to rendering sounds (a rendered sound space).

"sound scene" refers to a representation of the sound space listened to from a particular point of view within the sound space.

"sound object" refers to sound source that may be located within the sound space. A source sound object represents a sound source within the sound space. A recorded sound object represents sounds recorded at a particular microphone or position. A rendered sound object represents sounds rendered from a particular position.

"virtual space" may mean a visual space, a sound space or a combination of a visual space and corresponding sound space. In some examples, the virtual space may extend horizontally up to 360° and may extend vertically up to 180°

"virtual scene" may mean a visual scene, mean a sound scene or mean a combination of a visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a visual object.

"Correspondence" or "corresponding" when used in relation to a sound space and a visual space means that the sound space and visual space are time and space aligned, that is they are the same space at the same time.

"Correspondence" or "corresponding" when used in relation to a sound scene and a visual scene means that the sound space and visual scene are corresponding and a notional listener whose point of view defines the sound scene and a notional viewer whose point of view defines the visual scene are at the same position and orientation, that is they have the same point of view.

"real space" refers to a real environment, which may be three dimensional. "Real visual scene" refers to a representation of the real space viewed from a particular point of view within the real space. 'Real visual object' is a visible object within a real visual scene.

The "visual space", "visual scene" and visual object" may also be referred to as the "virtual visual space", "virtual visual scene" and "virtual visual object" to clearly differentiate them from "real visual space", "real visual scene" and "real visual object"

"mediated reality" in this document refers to a user visually experiencing a fully or partially artificial environment (a virtual space) as a virtual scene at least partially rendered by an apparatus to a user. The virtual scene is determined by a point of view within the virtual space.

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user.

"virtual reality" in this document refers to a form of mediated reality in which a user experiences a fully artificial environment (a virtual visual space) as a virtual scene displayed by an apparatus to a user.

"perspective-mediated" as applied to mediated reality, augmented reality or virtual reality means that user actions determine the point of view within the virtual space, changing the virtual scene.

"first person perspective-mediated" as applied to mediated reality, augmented reality or virtual reality means perspective mediated with the additional constraint that the user's real point of view determines the point of view within the virtual space.

"third person perspective-mediated" as applied to mediated reality, augmented reality or virtual reality means perspective mediated with the additional constraint that the user's real point of view does not determine the point of view within the virtual space.

"user interactive" as applied to mediated reality, augmented reality or virtual reality means that user actions at least partially determine what happens within the virtual space.

"displaying" means providing in a form that is perceived visually (viewed) by the user.

"rendering" means providing in a form that is perceived by the user.

DETAILED DESCRIPTION

The following examples may find application for mediated reality such as augmented reality or virtual reality. In some but not necessarily all examples, the mediated reality is perspective-mediated, for example, it may be first person perspective-mediated or third person perspective-mediated. In some but not necessarily all examples, the mediated reality is user interactive.

"Media" in this document is a term that means "sound", "visual" or "sound and visual".

Media content in this document refers to content (that which can be rendered) that is sound content (rendered for hearing), visual content (rendering for seeing) or multi-media content which is a combination of sound content and visual content (rendered for hearing and seeing simultaneously).

Media object in this document refers to content that which can be rendered at a particular position. It may be a virtual object, sound object, visual object or multi-media object which is an association of one or more sound objects and one or more visual objects.

Media content defines a media scene which may be all or part of a virtual scene, a visual scene and/or a sound scene. Media content may define one or more media objects which may be virtual objects, visual objects and/or sound objects. The media content may be used to enable mediated reality.

FIG. 1 illustrates an example of a method 100 for controlling rendering of a media scene.

At block 102, the method 100 comprises causing rendering of a first media scene based upon first time-evolving media content. Next, at block 104, the method 100 comprises causing determining of a priority for an event. Next, at block 106, the method 100 comprises assessing the priority for the event.

If the event is of sufficient priority, the method 100 moves to block 108. At block 108, the method 100 automatically causes modifying of the rendered first media scene, to render a modified second media scene based at least in part upon the first time-evolving media content and at least in part upon second time-evolving media content associated with the event.

If, however, the event is of insufficient priority, the method 100 returns to block 102 automatically causing continuation of the rendering of the first media scene based upon the first time-evolving content and not based upon media content associated with the event.

The first media scene based upon first time-evolving media content may be a first sound scene based upon first time-evolving sound content, may be a first visual scene based upon first time-evolving visual content or may be a first multi-media scene based upon first time-evolving sound content and first time-evolving visual content.

The first media scene based upon first time-evolving media content may therefore comprise a first sound scene based upon first time-evolving sound content and/or a first visual scene based upon first time-evolving visual content.

Media content may comprise one or more media objects. A media object may be a sound object and/or a visual object. A sound object is sound content (content that can be heard) that is rendered at a particular position within a sound space using spatial audio. A visual object is visual content (content that can be seen) that is rendered at a particular position within a visual space. The visual content may or may not be stereoscopic content.

Figure 2:
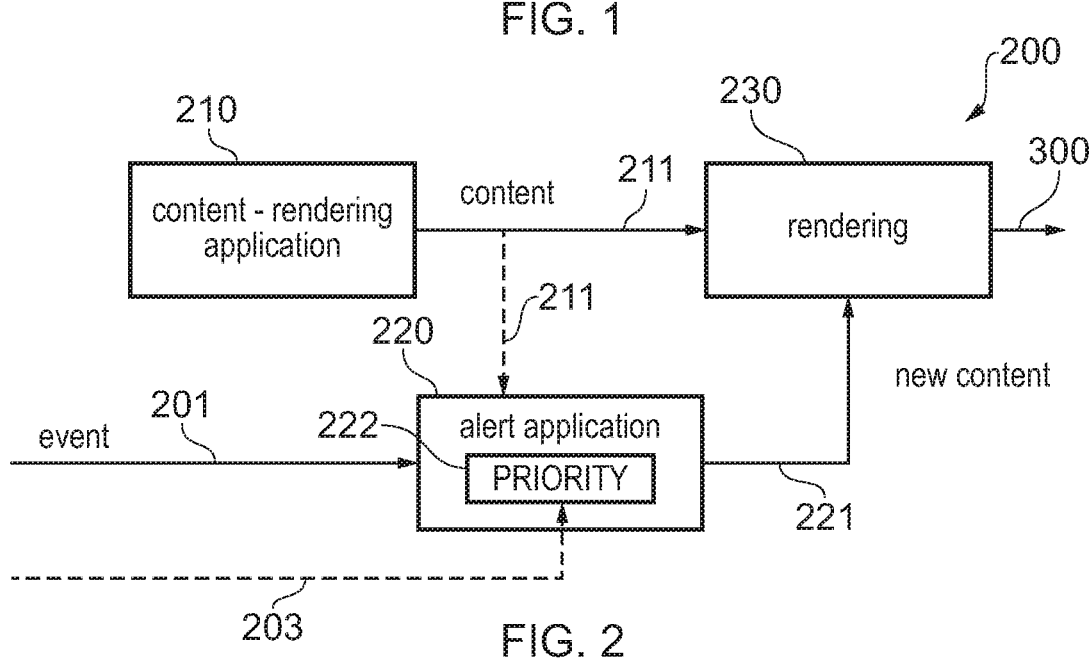
FIG. 2 illustrates an example of a system configured to render a media scene.

FIG. 2 illustrates an example of a system 200 configured to render a media scene 300. In this example, the system 200 comprises a rendering engine 230. The rendering engine 230 is configured to render a media scene 300 based upon media content 211 provided by a content-rendering application 210 (and optionally media content 221 provided by an alert application 220). The alert application 220 comprises a priority engine 222 configured to determine a priority for an event 201, the event being independent of the content-rendering application 210.

If the event 201 is of sufficient priority, as determined by the priority engine 222, the alert application 220 automatically controls the rendering engine 230 to modify the rendered media scene 300 based on media content 211 provided by a content-rendering application 210, to render a modified media scene 300 based at least in part upon media content 211 provided by the content-rendering application 210 and at least upon media content 221, associated with the event 201, provided by the alert application 220.

If the event 201 is of insufficient priority, the alert application 220 automatically controls the rendering engine 230 either explicitly by providing a command or implicitly by not providing the media content 221 associated with the event 201, to continue to render the rendered media scene 300 based upon media content 211 provided by the content-rendering application 210 and not based upon any media content 221 provided by the alert application 220/associated with the event 201.

In this way, the alert application 220 alerts a user of the system 200 to an event 201 if the event 201 is of sufficient priority but does not alert a user to an event 201 if the event is not of sufficient priority. The alert is placed 'within' the existing rendered media content 211 which continues to evolve in time. The alert may, for example, be placed 'within' the existing rendered media scene 300 (which being based on the media content 211 continues to evolve in time) as a media object rendered using spatial audio processing. The alert may thus be brought to the attention of the user but without stopping or otherwise stopping continuity of the rendering of the media content 211 from the content-rendering application 210. The alert may, in this way, be brought within the virtual reality created by the rendered media content 211 without stopping, suspending or destroying that virtual reality for the user. The user is therefore able to decide whether or not to pause or stop the rendering of the media content 211 or otherwise suspend or stop the virtual reality so that they can attend to the alert, without necessarily being forced to pause or stop.

The alert application 220 may receive as inputs a user input 203 for controlling priority determination and/or media content 211 for determining a relative priority of an event 201 compared to media content 211. The determination of whether or not an event is of sufficient or not sufficient priority may be dependent upon the user input 203 to the priority engine 222. The determination of whether or not an event is of sufficient or not sufficient priority may be a determination of whether or not an event is of sufficient or not sufficient priority compared to the media content 211 provided by the content-rendering application 210 to the rendering engine 230.

It will therefore be appreciated that the system 200 performs a method 100 comprising: rendering a first media scene 300 based upon media content 211 provided by a content-rendering application 210;
determining at an alert application 220, a priority for an event 201, the event 201 being independent of the content-rendering application 210, wherein
if the event 201 is of insufficient priority, determining to automatically continue to render the first media scene 300 based upon media content 211 provided by the content-rendering application 210 and not based upon any media content 221 associated with the event 201/provided by the alert application 220; and if the event is of sufficient priority, determining to automatically modify the rendered first media scene 300, to render a modified second media scene 300 based at least in part upon media content 211 provided by the content-rendering application 210 and at least in part upon media content 221 provided by the alert application 220 for alerting a user to the event 201.

When an event 201, which was of insufficient priority becomes of sufficient priority, either because its priority changes or because the threshold for determining whether a priority is sufficient or not changes, the system 200 is configured to immediately, in real-time, automatically modify the rendered media scene 300, to render a modified media scene 300 based at least in part upon media content 211 provided by the content-rendering application 210 and at least in part upon media content 221 provided by the alert application 220 for alerting a user to the event 201 which is now of sufficient priority.

In this way, the rendering of content associated with an event 201 of sufficient priority is rendered without delay.

The media content 211 provided by the content-rendering application 210 may, for example, originate from in-game audio of a video game, from one or more audio tracks of a video that is being rendered, from one or more tracks of music that is being rendered, from any other live or recorded audio media or audio-visual media etc.

The event 201 may be any suitable independent event that is an event that is independent of the content-rendering application 210.

In some examples, the event 201 may be a notification that alerts a user to a system-state. For example, a notification may be a system notification relating to a personal device, system or service of the user such as a programmed alarm, a calendar alert etc. For example, a notification may be a communication notification, for example, indicating there is an incoming telephone call or an incoming electronic message or some other communication event. For example, a notification may be a security notification, for example, indicating that a programmed security event has occurred such as noise above a threshold detected by a baby monitor, motion-detected on a camera etc.

In other examples, the event 201 may an environmental event that alerts a user to a local event that occurs in the user's environment, for example, within 10 m, 5 m, or 2 m of the user. This may, for example, be an event that a user would be expected to hear, see or otherwise notice if they were not preoccupied by the rendered media content 211. In some examples, the event 201 relates to sound, actions, gestures recorded locally to the user that the user may not be aware of or the user may not be sufficiently aware of because of the rendering of the media content 211.

Figure 3:
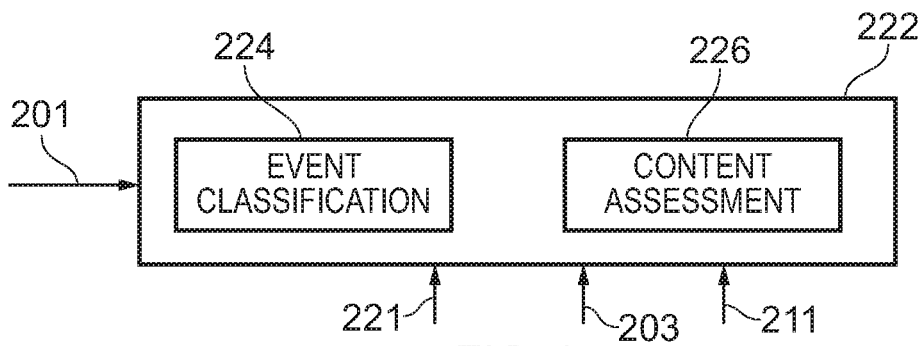
FIG. 3 illustrates an example of a priority engine configured to determine a priority of an event.

FIG. 3 illustrates an example of a priority engine 222. The priority engine 222 is configured to determine a priority of an event 201 based upon at least one criterion. The event may, for example, be an absolute criterion or it may be a relative criterion. The criterion may, for example, be user defined via the user input 203.

For example, the determination of whether or not an event has or does not have sufficient priority may be determined against an absolute threshold or against a relative threshold and, that threshold may be in some examples be wholly or partially controlled by a user-programming via the user input 203. Where a determination is against a relative threshold, that threshold may be dependent upon the media content 211 provided by the content-rendering application 210 to the rendering engine 230.

In the example of the priority engine 222 illustrated in FIG. 3, the priority engine 222 comprises an event classification module 224 configured to classify an event 201.

In some examples, classification of an event 201 may be based upon the origin of the event 201. In some examples, classification of an event 201 may be based upon metadata associated with the event 201. In some examples, classification of an event 201 may be based upon media content 221 associated with the event 201.

For example, if the event 201 is a notification, the notification may be identifiable by virtue of its origination or by virtue of data or metadata contained within the notification which typically has a predetermined data structure.

In other examples, the event 201 may be classified based upon media content 221 associated with the event 201. This may be appropriate when the event 201 is not a structured event like a notification sent by a particular application but is instead an environmental event such as a media source local to the user. In this situation, it may be desirable to identify the media source of the media content 221. It may for example be desirable to disambiguate between different sources of media, for example, a crying baby, a person speaking, a door bell ringing, a telephone ringing, or any other type of media.

The classification of media content 221 may be performed by using machine learning, for example, a neural network. The neuron network can be programmed using machine learning to identify and classify different events 201.

The classification of media content may for example comprise detecting unchanging periods (e.g. silence) and excluding unchanging periods from processing, then processing the remaining media content. The media content may be windowed and then a fast Fourier transform applied to extract a feature vector. A trained neural network may be used to classify the feature vector. The cost used in the neural network may, for example, be based on a cosine distance $d_{cos}(x, y)$ between the feature vector $(x_i)$ and an average feature vector $(y_i)$ where $d_{cos}(x, y)=1-(d_{xy}/d_x d_y)$, $d_{xy}=Sum_n (x_i y_i)$, $d_{xx}=[Sum_n (x_i x_i)]^{1/2}$, $d_{yy}=[Sum_n (y_i y_i)]^{1/2}$.

It may be desirable for the event classification module 224 to be programmable by a user via a user input 203. The user input 203 may, for example, be used to enable or control classification of an event 201 and/or may be used to prioritize an event once classification has occurred.

In some examples, classification may also comprise recognition. For example, face recognition or voice recognition.

Having classified different events 201 it may be desirable to associate each class of event with a different priority. For example, a crying baby may be allocated a highest priority whereas a ringing telephone may, in some examples, be allocated a lower priority. In some but not all examples, the priority may increase with increasing volume of sound content recorded. In some but not all examples, the priority may increase with changing activity of a person or object creating the media content recorded. The changing activity may be approaching closer to the user, gesturing to the user. The user via the user input 203 may program the different priority associated with different classes of events thereby providing a very personal and bespoke system 200 that provides personal alerts to the user via the rendered media scene 300.

In some circumstances it may be desirable for prioritization of an event 201 to be dependent upon the priority of the media content 211 already being rendered. The priority engine 222 may, for example, comprise a content assessment module 226 which receives the media content 211 and assesses that media content 211. The assessment of the media content 211 may be based upon metadata associated with the media content 211 or some other parameter or it may be based upon a classification of the media content 211 similar to that performed by the event classification module 224. In this way, it may be possible to assess the priority of the media content 211 being rendered. The decision of whether or not the event 201 has sufficient priority or does not have sufficient priority may therefore be assessed against a dynamic threshold determined by the media content 211. For example, a particular event 201 may create an alert no matter what the media content 211 being rendered is, however, a different event 201 may only cause an alert when the media content 211 being rendered is of lower priority.

It will therefore be appreciated that the priority engine 222 of FIG. 3 may be controlled by a user via the user input 203 to provide a personal alert service that modifies the rendered media scene 300 (based on the media content 211) to also render media content 221 but only when conditions specified by the user have been met, i.e. has sufficient priority, and those conditions may, or may not, be dependent upon the time varying media content 211 provided by the content-rendering application 210 and/or media content 221.

In some examples, it may also be desirable to have an escalating priority system, where the priority of an event 201 is increased if it repeats within a certain period of time.

FIGS. 4A to 4F illustrate examples of a rendered media scene 300. The position of a user 310 is the same in each FIG. The user is illustrated towards the centre of the rendered media scene 300. Media objects 302 comprised in the rendered media scene 300 are located at different positions within the media scene 300.

Figure 4A:
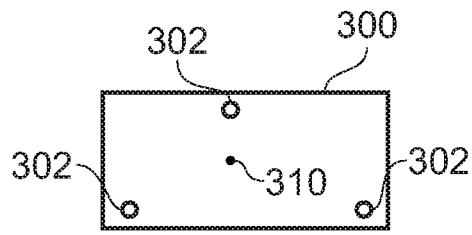
FIGS. 4A to 4F illustrate examples of a rendered media scene.

FIG. 4A illustrates a rendered media scene 300 based upon only the media content 211 provided by the content-rendering application 210 and not based on any other media content. The rendered media scene 300 is not, for example, based upon media content 221 provided by an alert application 220/associated with the event 201. This FIG. illustrates an original media scene 300 that will be modified differently in each of FIGS. 4B to 4F to provide different modified media scenes 300.

FIGS. 4B to 4F illustrate rendering of a media scene 300 based upon the media content 211 provided by the content-rendering application 210 and in addition, media content 221 associated with an event 201 provided by the alert application 220.

The media content 211 upon which the original rendered media scene 300 is based in FIG. 4A is the same media content 211 upon which the modified rendered media scene 300 is based in FIGS. 4B to 4F. The rendered media scene 300 in FIGS. 4B to 4F differ from the rendered media scene 300 in FIG. 4A in that the rendered media scene 300 is additionally based upon media content 221, associated with an event 201, provided by the alert application 220.

It should be appreciated that although FIGS. 4A to 4F necessarily illustrate a single instance in time, the media content 211 and/or the media content 221 may be evolving in time, that is they may be changing dynamically with the passage of time. These figures do not explicitly illustrate this time-evolution, however, it should be appreciated that the time evolution of the media content 211 and/or the time evolution of the media content 221 fall within the scope of these examples. In the examples of FIGS. 4B to 4F, for example, the rendering of the media scene 300 may be based upon time-evolving media content 211 provided by the content-rendering application 201 and time-evolving media content 211, associated with the event 201, provided by the alert application 220.

It should be appreciated that although FIGS. 4A to 4F illustrate a media scene 300 in two-dimensions, it should be appreciated that the media scene 300 may be multi-dimensional. For example, it may be a three-dimensional media space and a media object 302 may be located at a three-dimensional position within a three dimensional media scene 300.

It is often desirable for the rendering of the media content 221 associated with the event 201 to be performed without delay as soon as the event 201 occurs or has been detected.

In the examples of FIGS. 4B to 4F, the user 310 continues to be rendered media content 211 provided by the content-rendering application 210 and in addition is rendered content 221 provided by the alert application 220 as a new media object 302. In the examples of FIGS. 4B to 4F, the new media object 302 based upon the media content 221 is illustrated using a dashed circle to differentiate it from the media object 302 of the original media scene 300 of FIG. 4A.

In the examples of FIGS. 4B to 4F, the new rendered media scene 300 maintains at least some of the media objects 302 of the original media scene 300 illustrated in FIG. 4A. In some examples, all of the media objects 302 of the original media scene 300 illustrated in FIG. 4A are maintained whereas in other examples one, more than one or all of the original media objects 302 of the original media scene 300 of FIG. 4A may be selectively muted, and/or replaced by a new media object 302, for example, associated with the event 201.

It should be appreciated that although the description of FIGS. 4B to 4F below describe in detail examples where the media scene 300 is a sound scene and the media objects 302 are sound objects, in other examples the media scene 300 is a visual scene and the media objects 302 are visual objects, and in other examples the media scene 300 is a multi-media scene and the media objects 302 are sound objects and/or visual objects.

The rendering engine 230 may be configured to control characteristics of a new visual object 302 defined by the media content 221. For example, the rendering engine 230 may be configured to control a position, size or other characteristic of the new visual object 302 for the visual content 221 within the visual scene 300, a spatial extent of the new visual object 302 for the visual content 221 within the visual scene 300, and other characteristics of the visual content 221 such as, for example, transparency.

The rendering engine 230 may alternatively or additionally be configured to control characteristics of a new sound object 302 defined by the media content 221. For example, the rendering engine 230 may be configured to control the volume of the sound content 221, a position of the new sound object 302 for the sound content 221 within the sound scene 300, a spatial extent of the new sound object 302 for the sound content 221 within the sound scene 300, and other characteristics of the sound content 221 such as, for example, tone or reverberation etc.

The rendering engine 230 may, for example be a spatial audio processing system that is configured to control the position and/or extent of a sound object 302 within a sound scene 300.

The distance of a sound object 302 from an origin at the user 310 may be controlled by using a combination of direct and indirect processing of audio signals representing the sound object 302.

The audio signals are passed in parallel through a "direct" path and one or more "indirect" paths before the outputs from the paths are mixed together. The direct path represents audio signals that appear, to a listener, to have been received directly from an audio source and an indirect (decorrelated) path represents audio signals that appear to a listener to have been received from an audio source via an indirect path such as a multipath or a reflected path or a refracted path. Modifying the relative gain between the direct path and the indirect paths, changes the perception of the distance D of the sound object 302 from the listener in the rendered sound scene 300. Increasing the indirect path gain relative to the direct path gain increases the perception of distance. The decorrelated path may, for example, introduce a pre-delay of at least 2 ms.

In some situations, for example when the sound scene 300 is rendered to a listener through a head-mounted audio output device, for example headphones using binaural audio coding, it may be desirable for the rendered sound space to remain fixed in space when the listener turns their head in space. This means that the rendered sound space needs to be rotated relative to the audio output device by the same amount in the opposite sense to the head rotation. The orientation of the rendered sound space tracks with the rotation of the listener's head so that the orientation of the rendered sound space remains fixed in space and does not move with the listener's head. The system uses a transfer function to perform a transformation T that rotates the sound objects within the sound space. For example, a head related transfer function (HRTF) interpolator may be used for binaural audio. As another example, Vector Base Amplitude Panning (VBAP) may be used for loudspeaker format (e.g. 5.1) audio.

The sound scene 300 may be considered to be a collection of spatial channels where each spatial channel is a different direction. In some examples, the collection of spatial channels may be globally defined for all sound objects. In other examples, the collection of spatial channels may be locally defined for each sound object. The collection of spatial channels may be fixed or may vary dynamically. In some but not necessarily all examples, each spatial audio channel may be rendered as a single sound source using amplitude panning.

For example, in spherical polar co-ordinates the direction of the spatial channel $S_{nm}$ may be represented by the couplet of polar angle t and azimuthal angle $\Phi_m$. Where $\vartheta_n$ is one polar angle in a set of N possible polar angles and $\Phi_m$ is one azimuthal angle in a set of M possible azimuthal angles.

A sound object 302 at position z may be associated with the spatial channel $S_{nm}$ that is closest to Arg(z).

If a sound object 302 is associated with a spatial channel $S_{nm}$ then it is rendered as a point source.

A sound object 302 may however have spatial extent 304 and be associated with a plurality of spatial audio channels. For example a sound object may be simultaneously rendered in a set of spatial channels {S}' defined by Arg(z) and a spatial extent 304 of the sound object. That set of spatial channels {S}' may, for example, include the set of spatial channels $S_{n'm'}$ for each value of n' between $n-\delta_n$ and $n+\delta_n$ and of m' between $n-\delta_m$ and $n+\delta_m$, where n and m define the spatial channel closest to Arg(z) and $\delta_n$ and $\delta_m$ define in combination a spatial extent 304 of the sound object 302. The value of $\delta_n$, defines a spatial extent 304 in a polar direction and the value of $\delta_m$ defines a spatial extent 304 in an azimuthal direction.

The number of spatial audio channels and their spatial relationship in the set of spatial channels {S}' is dependent upon the desired spatial extent 304 of the sound object 302.

A sound object 302 may be simultaneously rendered in a set of spatial channels {S}' by decomposing the audio signal representing the sound object 302 into multiple different frequency sub-channels 51 and allocating each frequency sub-channel 51 to one of multiple spectrally-limited audio signals.

Each of the multiple spectrally-limited audio signals may have one or more frequency sub-channels allocated to it (as an allocated frequency sub-channel). Each frequency sub-channel may be allocated to only one spectrally-limited audio signal (as an allocated frequency sub-channel).

Each spectrally-limited audio signals is allocated into the set of spatial audio channels {S}.

For example, each spectrally-limited audio signal is allocated to one spatial audio channel and each spatial audio channel comprises only one spectrally-limited audio signal, that is, there is a one-to-one mapping between the spectrally-limited audio signals and the spatial audio channels. In some but not necessarily all examples, each spectrally-limited audio signal may be rendered as a single sound source using amplitude panning.

For example, if the set of spatial channels {S} comprised X channels, the audio signal representing the sound object would be separated into X different spectrally-limited audio signals in different non-overlapping frequency bands, each frequency band comprising one or more different frequency sub-channels that may be contiguous and/or non-contiguous. This may be achieved using a filter bank comprising a selective band pass limited filter for each spectrally-limited audio signal/spatial audio channel or by using digital signal processing to distribute time-frequency bins to different spectrally-limited audio signals/spatial audio channels. Each of the X different spectrally-limited audio signals in different non-overlapping frequency bands would be provided to only one of the set of spatial audio channels {S}. Each of the set of spatial audio channels {S} would comprise only one of the X different spectrally-limited audio signals in different non-overlapping frequency bands.

Where digital signal processing is used to distribute time-frequency bins to different spatial audio channels, then a short-term Fourier transform (STFT) may be used to transform from the time domain to the frequency domain, where selective filtering occurs for each frequency band followed by an inverse transform to create the spectrally-limited audio signals for that frequency band. The different spectrally-limited audio signals may be created using the same time period or different time periods for each STFT. The different spectrally-limited audio signals may be created by selecting frequency sub-channels of the same bandwidth (different center frequencies) or different bandwidths. The different spatial audio channels {S} into which the spectrally-limited audio signals are placed may be defined by a constant angular distribution e.g. the same solid angle ($\Delta\Omega=\sin\theta\cdot\Delta\theta\cdot\Delta\Phi$ in spherical coordinates) or by a non-homogenous angular distribution e.g. different solid angles.

Which frequency sub-channel is allocated to which spectrally-limited audio signal/spatial audio channel in the set of spatial audio channels {S} may be controlled by random allocation or may be determined based on a set of predefined rules.

The predefined rules may, for example, constrain spatial-separation of spectrally-adjacent frequency sub-channels to be above a threshold value. Thus frequency sub-channels adjacent in frequency may be separated spatially so that they are not spatially adjacent. In some examples, effective spatial separation of the multiple frequency sub-channels that are adjacent in frequency may be maximized.

The predefined rules may additionally or alternatively define how frequency sub-channels are distributed amongst the spectrally-limited audio signals/the set of spatial audio channels {S}. For example, a low discrepancy sequence such as a Halton sequence, for example, may be used to quasi-randomly distribute the frequency sub-channels amongst the spectrally-limited audio signals/the set of spatial audio channels {S}.

The rules may specify that movement of a sound object 302 having an extended spatial extent should be achieved by not moving all of the multiple spectrally-limited audio signals or frequency sub-channels distributed amongst different spatial audio channels simultaneously to different spatial audio channels but should be achieved by keeping a first set of the multiple spectrally-limited audio signals or frequency sub-channels stationery with respect to their current spatial audio channels and moving a second set of the multiple spectrally-limited audio signals or frequency sub-channels to different spatial audio channels.

Figure 4D:
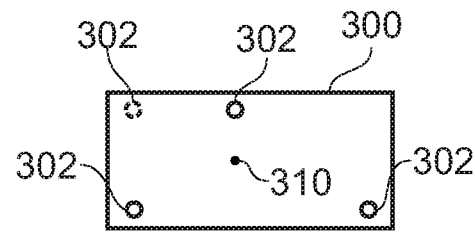
Figure 4B:
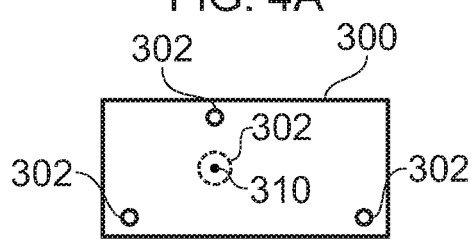

In the example of FIG. 4B, the new sound object 302 based upon the sound content 221 is deliberately located at the position of the user 310. In some examples, it may be desirable to render the new sound object 302 at a position within a user's head. This is possible if the user is wearing headphones. In general, the rendering of a sound object 302 within the space between a user's ears is generally avoided as it can be disorienting. However, as it is generally avoided, it is also a useful approach to provide a new sound object as an alert that can be differentiated from the sound objects 302 of the original sound scene 300.

Figure 4E:
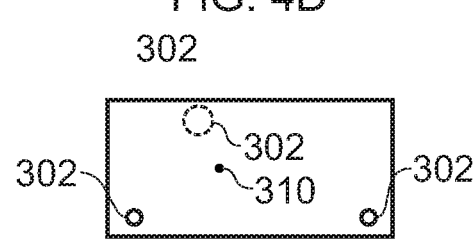
Figure 4C:
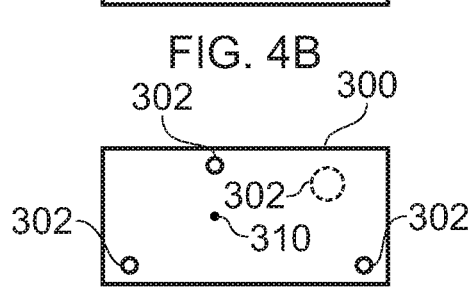

FIG. 4C illustrates an example of a new media object 302 based upon the media content 221 that is rendered at a position distant from the user 310. In this example, a new sound object 302 based upon the sound content 221 is rendered at a position distant from the user 310 and outside of the user's head. Although the new sound object 302 is indicated at a position, it may in fact be perceived by the user as coming from a particular direction rather than from a particular position and the term position should be construed accordingly in context.

In the example of FIG. 4D, the position of the new media object 302 based upon the media content 221 is a fixed position within the media scene 300. Therefore no matter what the event 201 and no matter what the media content 221, the new media object 302 associated with the event 201 and based upon the media content 221 is always rendered at the same default fixed position. In this example, the position of a new sound object 302 based upon the sound content 221 is a fixed position within the sound scene 300. Although the new sound object 302 is indicated at a fixed position, it may in fact be perceived by the user as coming from a particular fixed direction rather than from a particular position and the term position should be construed accordingly in context.

FIG. 4E illustrates an example in which the new media object 302 based upon the media content 221 provided by the alert application 220 and associated with the event 201 replaces a media object 302 of the original media scene 300. In this example, the new sound object 302 based upon the sound content 221 provided by the alert application 220 and associated with the event 201 replaces a sound object 302 of the original sound scene 300. In effect, the original sound object 302 has been muted and the new sound object 302 based on the sound content 221 has been placed at its position.

In other examples, it may be possible to mute one or more sound objects 302 of the original sound scene 300 whether or not one or more new sound objects 302 associated with events 201 are used or rendered at the same positions as those muted sound objects 302.

Figure 4F:
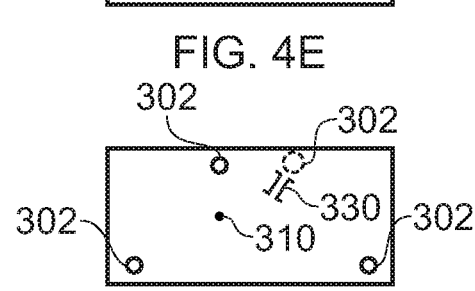

FIG. 4F illustrates an example in which a new sound object 302 associated with an event 201 and based upon the sound content 221 is rendered as if it is partially obscured by an aperture 330. The aperture 330 operates as a window or door through which the new sound object 302 is heard by the user 310. This may, for example, be achieved by increasing the reverberation associated with the new sound object 302, controlling or reducing its spatial extent so that its spatial extent corresponds to the spatial extent of the aperture 330 and locating the sound object 302 so that it corresponds with a position of the aperture 330. In some examples, the aperture 330 may be of a fixed size and/or position for all new sound objects 302 associated with event 201 such that all of the alerts for the events 201 that have sufficient priority are rendered as sound objects through the same aperture 330.

Although in these examples at least some of the original media objects 302 of the original media scene 300 are maintained in the modified media scene 300 of FIGS. 4B to 4D, in other examples all of the media objects 302 of the original media scene 300 of FIG. 4A may be removed e.g. muted. In this case, the modified media scene 300 of FIGS. 4B to 4F would only comprise one or more media objects based upon the media content 221.

In some examples, a media object 302 associated with an event 201 is rendered based upon a classification of the event 201 and/or a classification of the media content 221.

For example, when an event 201 is a notification, the notification may be provided to the user 310 as a new media object 302, for example a sound object that is inside the user's head (FIG. 4B) or externalized, outside the user's head (FIG. 4C). If the new media object 302 is externalized, then it may be rendered at a fixed position (FIG. 4D) or in a variable position, it may replace an existing media object 302 (FIG. 4E) or may not, and it may be rendered as if it is heard through an aperture 330 (FIG. 4F), or not.

In the examples where the event 201 is an environment event based upon a sound event local to the user then the sound object 302 associated with that event 201 and based upon the sound content 221 may be rendered as an external sound object 302 (FIG. 4C) and its position within the rendered sound scene 300 may correspond with its actual position relative to the user in the local environment.

In the examples where the event 201 is an environment event based upon a movement or gesture event local to the user then the visual object 302 associated with that event 201 and based upon the visual content 221 may be rendered as a visual object 302 (FIG. 4C) and its position within the rendered visual scene 300 may correspond with its actual position relative to the user in the local environment.

Figure 5A:
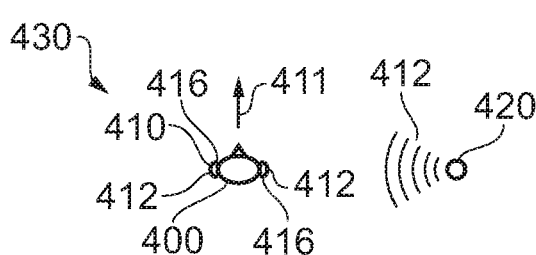
FIG. 5A illustrates a local environment that creates the event that causes rendering of the modified media scene illustrated in FIG. 5B.
Figure 5B:
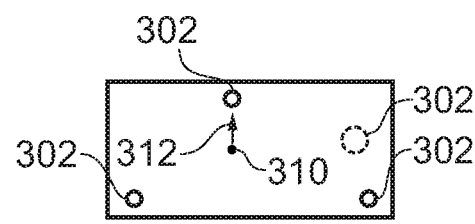
Figure 6A:
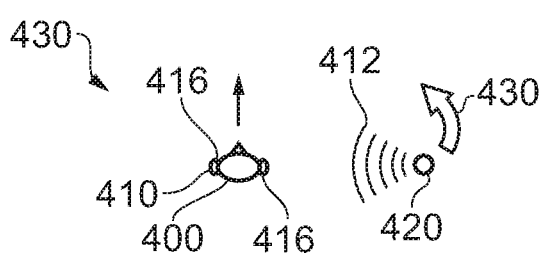
FIG. 6A illustrates a local environment that creates the on-going event that causes rendering of the modified media scene illustrated in FIG. 6B.
Figure 6B:
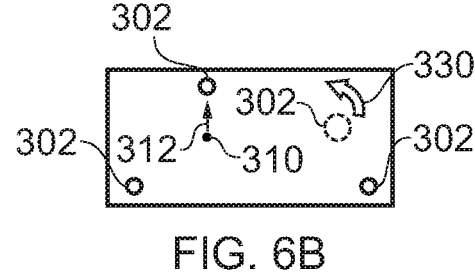

FIGS. 5B and 6B illustrate examples of a modified media scene 300 based upon the example of FIG. 4C. FIG. 5A illustrates a local environment 430 that creates the event 201 that causes rendering of the modified media scene 300 illustrated in FIG. 5B. FIG. 6A illustrates a local environment 430 that creates the event 201 that causes rendering of the modified media scene 300 illustrated in FIG. 6B.

FIG. 5A illustrates an example of a scene 430 (local environment) occupied physically by a user 400 wearing a headset 410. The orientation of the user 400 is given by the arrow 411. A local media source 420 changes the environment (e.g. emits sound 412 changing the sound scene, or moves changing the visual scene). In this example, the user 400 is at a position R1 and the media source 420 is at a position R2 where the vectors R1 and R2 are measured relative to an arbitrary origin. The relative position of the media source 420 relative to the user 400 is given by the vector R2−R1 and the orientation of the media source 420 relative to the user 400 is given by ARG (R2−R1).

The position and/or the orientation of the media source 420 may be determined by positioning the media source 420 or by performing diversity reception of the sound 412 emitted by the media source when it is a sound source 420.

The headset 410 may comprise (headphones) comprising a left ear loudspeaker and a right ear loudspeaker for rendering a sound scene to a user and/or may comprise a head-mounted display or displays for rendering a visual scene to a user.

The media 412 produced by the media source 420 is recorded and is used as media content 221 for an event 201 associated with the media source 420. In some examples the headset 410, may comprise one or more microphones 416 for recording the emitted sound 412 as sound content 221. In some examples, the microphones 416 may form a phase array suitable for orientating the sound source 420 relative to the user 400.

When the event 210 associated with the media source 420 is of sufficient priority, the system 200 automatically modifies the original rendered media scene 300 to render a modified media scene 300 based at least in part upon the original time-evolving media content 211 of the original media scene and at least in part upon the second time-evolving media content 221 associated with the event 201. The time-evolving content 221 provided by the alert application 220 and associated with the event 201 is rendered as a new media object 302 in the media scene 300. The position at which the new media object 302 is rendered relative to a user 310 in the media scene 300 at an orientation (bearing) 312 that is the same as the orientation (bearing) of the media source 420 relative to the user 400 in the scene 430 of FIG. 5A.

Therefore in the example of FIG. 5B, if the user 310 has a position P1 and the new media object is rendered at a position P2 then ARG (P2−P1)=ARG (R2−R1) and, it may also be desirable for P2−P1=R2−R1.

Therefore, in the examples of FIGS. 5A and 5B, the rendering by the rendering engine 230 is performed via a headset 410 (e.g. earphones) and the event 201 may relate to sound content 221 captured externally to the earphones 410 at multiple locations.

The sound content 221 is rendered to the user via the earphones 410 from a direction corresponding to the direction of a source 420 of the sound content 221 external to the earphones 410.

FIG. 6A is very similar to FIG. 5A and additionally illustrates movement 430 of the sound source 420. FIG. 6B is similar to FIG. 5B and additionally illustrates movement 430 of the new sound object 302. It should be appreciated that the movement 330 of the new sound object 302 may correspond in real-time t to the movement 430 of the sound source 420. For example, it may be that ARG (R2($t$)−R1($t$)) =ARG (P2($t1$)−P1($t$)).

FIGS. 7A and 7B illustrate examples of a modified media scene 300 based upon the example of FIG. 4C. Media objects 302 for multiple different contemporaneous events 201 are rendered sequentially.

FIG. 8A illustrate an example of a modified media scene 300 based upon the example of FIG. 4C. Media objects 302 for multiple different contemporaneous events 201 are rendered simultaneously. FIG. 8B illustrates a local environment 430 that creates the events 201 that causes rendering of the modified media scene 300 illustrated in FIG. 8A.

FIGS. 7A, 7B and FIGS. 8A, 8B, illustrate that the system 200 is configured to automatically render a media scene 300 based upon media content 211 provided by the content-rendering application 210 and based upon media content 221 provided by the alert application for more than one event 201 of sufficient priority. It is, of course also possible for the system 200 to reject multiple events 201 of insufficient priority and in this case to render a media scene 300 that is not based upon any media content 221 associated with those rejected events 201.

In the example of FIGS. 7A and 7B, the multiple events 201 are rendered sequentially. In this example, there are a plurality of contemporaneous events 201 that are of sufficient priority to be rendered, including a first event and a second event. However, the media content 221 associated with these multiple events 201 is not rendered simultaneously but is rendered sequentially. That is at a first time, first media content 221 associated with the first event 201 and provided by the alert application 220 is rendered in the media scene 300 as a media object 302 (FIG. 7A) but there is no rendering of any content 221 associated with the second event 201. Then at a subsequent second time, later than the first time, the second media content 221 associated with the second event 201 and provided by the alert application 220 is rendered in the media scene 300 as a new media object 302 (FIG. 7B). In this way, the multiple contemporaneous events 201 of sufficient priority are converted into different sequential events 201 and each of the sequential events is separately rendered in the media scene 300 at different times such that the rendering of the separate events does not overlap. The order in which the contemporaneous events 201 are rendered may, for example, be based upon priority.

In this example, the method 100 comprises determining, at an alert application 220, a priority from multiple events 201, the events being independent of the content-rendering application 210. If a first one of the multiple events is of sufficient priority and a higher priority than a second one of the multiple events, the method causes automatic modification of the rendered media scene 300 to render a modified second media scene 300 based at least in part upon second content provided by the content-rendering application and at least in part upon media content provided by the alert application 220 for alerting a user to the first higher priority event but not the second lower priority event, then if the second one of the multiple events is of sufficient priority, automatically causing modification of the rendered first media scene, to render a modified second media scene 300 based at least in part upon media content provided by the content-rendering application 210 and at least in part upon media content 221 provided by the alert application 220 for alerting a user to the second lower priority event but not the first higher priority event.

If a third one of the multiple event 201 is of insufficient priority, then the method determines to render the media scene 300 based upon media content provided by the content-rendering application 210 and not based upon a media content provided by the alert application 220 for the third event 201.

Thus multiple contemporaneous events 201 of sufficient priority may be rendered sequentially one at a time in a priority order.

The rendering of the multiple contemporaneous events of sufficient priority, may, for example, occur at a fixed/default position (FIG. 4D) and/or occur via an aperture 330 (FIG. 4F).

FIG. 8A illustrate an example of a modified media scene 300 based upon the example of FIG. 4C. Media objects 302 for multiple different contemporaneous events 201 are rendered simultaneously. FIG. 8B illustrates a local environment 430 that creates the events 201 that causes rendering of the modified media scene 300 illustrated in FIG. 8A.

FIG. 8A illustrates an example of a media scene 300 comprising simultaneously two new media objects 302 associated with different contemporaneous events 201. FIG. 8B illustrates a scene 430 in which the user 400 is located wearing a headset 410. In this example there are two external media sources 410 that simultaneously produce media 412. In this example the two new media objects 302 rendered in the media scene 300 correspond to these two media sources 410 and the direction/orientation of the media objects 302 in the media scene 300 in FIG. 8A corresponds to the orientation of the media sources 410 to the user 400 in FIG. 8B. The two new media objects 302 rendered in the media scene 300 are sound objects that correspond to two sound sources 410 and the direction/orientation of the sound objects 302 in the sound scene 300 in FIG. 8A corresponds to the orientation of the sound sources 410 to the user 400 in FIG. 8B.

As previously described, the rendering engine 230 may be configured to control characteristics of a new visual object 302 defined by the media content 221 instead of or in addition to controlling characteristics of a new sound object 302 defined by the media content 221.

The rendering engine 230 may be configured to control a position, size or other characteristic of the new visual object 302 for the visual content 221 within the original content 211 of the visual scene 300, a spatial extent of the new visual object 302 for the visual content 221 within the visual scene 300, and other characteristics of the visual content 221 such as, for example, transparency.

In the examples of FIGS. 4B to 4F, the user 310 continues to be rendered media content 211 provided by the content-rendering application 210 and in addition is rendered new content 221 associated with the event 201 and provided by the alert application 220 as a new media object 302.

FIG. 9A illustrates an example in which the rendered media content 211 provided by the content-rendering application 210 comprises a visual scene 300 rendered via virtual reality.

As illustrated in FIGS. 9B and 9C, the new visual object 302 for the visual content 221 within the visual scene 300 is rendered as window 600 to the real space (visual content 221) outside the virtual space. In some but not necessarily all examples, the event 201 is triggered by a person 602 and the visual content 221 rendered within the window is a live image of at least a part of the person 602.

In some but not necessarily all examples, a characteristic of the window (e.g. size, position, transparency) depends upon an action of the person triggering the event 201. It may for example, be dependent upon a proximity of the person to the user and/or may depend upon the sound produced by the person and/or may depend upon recognition of the person. The proximity of the person may be determined using positioning tags or by creating depth maps by, for example, stereoscopically capturing a projected infrared pattern. The dependency upon the sound produced by the person may be a dependency on volume (amplitude) and/or a dependency on frequency spectrum and/or a dependency upon whether the sound is directed towards the user. The recognition of a person may, for example, be based on facial recognition and/or voice recognition.

The size and/or transparency of the window may depend upon how and by how much one or more thresholds are exceeded. The threshold may include one or more of a proximity threshold, a volume threshold, a spectrum threshold, a directivity threshold, a recognition threshold, any functional combination of them.

In one example, the transparency of the window is dependent upon the extent to which sound is directed towards the user and/or the size of the window is dependent upon the volume of the sound.

In one example use scenario, illustrated in FIG. 9B, the user is playing a virtual reality game. The user's daughter wishes to get the user's attention and shouts "Hey!" loudly. This triggers an event 201 and a visual object 302 for visual content 221 associated with the event 201 is rendered as window 600 to his daughter 602 in the real space. As she is shouting loudly at the user the window 600 is large and clear. What the daughter 602 has shouted may also be rendered to the user.

In another example use scenario, illustrated in FIG. 9C, the user is playing a virtual reality game. The user's daughter speaks to him in a normal volume voice. This triggers a different event 201 and a visual object 302 for visual content 221 associated with the event 201 is rendered as a window 600 to his daughter 602 in the real space. As she is talking, at the user the window 600 is smaller and clear. What the daughter 602 has shouted may also be rendered to the user.

The system 200 may be implemented as a controller 500.

Implementation of a controller 500 may be as controller circuitry. The controller 500 may be implemented in hardware alone, have certain aspects in software including firmware alone or can be a combination of hardware and software (including firmware).

As illustrated in FIG. 10A the controller 500 may be implemented using instructions that enable hardware functionality, for example, by using executable instructions of a computer program 506 in a general-purpose or special-purpose processor 502 that may be stored on a computer readable storage medium (disk, memory etc.) to be executed by such a processor 502.

The processor 502 is configured to read from and write to the memory 504. The processor 502 may also comprise an output interface via which data and/or commands are output by the processor 502 and an input interface via which data and/or commands are input to the processor 502.

The memory 504 stores a computer program 506 comprising computer program instructions (computer program code) that controls the operation of the apparatus 500 when loaded into the processor 502. The computer program instructions, of the computer program 506, provide the logic and routines that enables the apparatus to perform the methods illustrated in FIGS. 1-8. The processor 502 by reading the memory 504 is able to load and execute the computer program 506.

In some but not necessarily all examples, the apparatus (controller) 500 may comprise:
at least one processor 502; and
at least one memory 504 including computer program code
the at least one memory 504 and the computer program code configured to, with the at least one processor 502, cause the apparatus 500 at least to perform:
determining a priority for an event, the event being independent of a content-rendering application that provides media content rendered in a first media scene; automatically determining to cause modification of the rendered first media scene, to render a modified second media scene based at least in part upon media content provided by the content-rendering application and at least in part upon other media content associated with the event.

In some but not necessarily all examples, the apparatus (controller) 500 may comprise:
at least one processor 502; and
at least one memory 504 including computer program code
the at least one memory 504 and the computer program code configured to, with the at least one processor 502, cause the apparatus 500 at least to perform:
causing rendering of a first media scene based upon first time-evolving media content;
causing determining of a priority for an event
if the event is of sufficient priority, automatically causing modification of the rendered first media scene, to render a modified second media scene based at least in part upon the first time-evolving media content and at least in part upon second time-evolving media content associated with the event; and
if the event is of insufficient priority, automatically causing continuation of the rendering of the first media scene based upon the first time-evolving content and not based upon media content associated with the event.

In some but not necessarily all examples, the apparatus (controller) 500 may comprise:
at least one processor 502; and
at least one memory 504 including computer program code
the at least one memory 504 and the computer program code configured to, with the at least one processor 502, cause the apparatus 500 at least to perform:
determining a priority for an event, the event being independent of a content-rendering application that provides media content rendered in a first media scene
if the event is of insufficient priority, automatically determining to cause modification of the rendered first media scene, to render a modified second media scene based at least in part upon media content provided by the content-rendering application and at least in part upon media content associated with the event.

As illustrated in FIG. 10B, the computer program 506 may arrive at the apparatus 500 via any suitable delivery mechanism 510. The delivery mechanism 510 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 506. The delivery mechanism may be a signal configured to reliably transfer the computer program 506. The apparatus 500 may propagate or transmit the computer program 506 as a computer data signal.

Although the memory 504 is illustrated as a single component/circuitry it may be implemented as one or more separate components/circuitry some or all of which may be integrated/removable and/or may provide permanent/semi-permanent/dynamic/cached storage.

Although the processor 502 is illustrated as a single component/circuitry it may be implemented as one or more separate components/circuitry some or all of which may be integrated/removable. The processor 502 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1-9 may represent steps in a method and/or sections of code in the computer program 506. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The system 200 may be a module. The priority engine 222 and any of its sub-components may be a module, the rendering engine may be a module, the alert application may be a module. Any module may be provided on a dedicated or shared controller 500.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    rendering a first media scene based upon media content provided with a content-rendering application via one or more rendering devices configured to be worn by a user;
    determining a priority for a local event that occurs near the user, where the local event is in an environment around the user, the local event being independent of the content-rendering application; and
    automatically modifying the rendered first media scene to render a modified second media scene based at least in part upon the media content provided with the content-rendering application and at least in part upon other media content associated with the local event.

2. The method as claimed in claim 1, wherein when the local event becomes of sufficient priority based at least in part on a comparison of the priority for the local event with a threshold, determining to immediately, in real-time, automatically modify the rendered first media scene to render the modified second media scene based at least in part upon the media content provided with the content-rendering application and at least in part upon the other media content associated with the local event.

3. The method as claimed in claim 1, further comprising determining the priority of the local event relative to the media content provided with the content-rendering application.

4. The method as claimed in claim 1, further comprising:
    determining, with an alert application, the priority for the local event that occurs near the user, where the local event is in the environment around the user, the local event being independent of the content-rendering application;
    when the local event is of insufficient priority based at least in part on a comparison of the priority for the local event with a threshold, determining to automatically continue to render the first media scene based upon the media content provided with the content-rendering application and not based upon media content provided with the alert application; and when the local event is of sufficient priority based at least in part on the comparison of the priority for the local event with the threshold, determining to automatically modify the rendered first media scene to render the modified second media scene based at least in part upon the media content provided with the content-rendering application and at least in part upon the other media content associated with the local event provided with the alert application for alerting the user to the local event.

5. The method as claimed in claim 1, wherein the rendered first media scene based upon the media content comprises a first sound scene based upon sound content, and wherein rendering a modified second sound scene based at least in part upon other sound content provided with an alert application comprises rendering the other sound content provided with the alert application at a position dependent upon the other sound content; or wherein rendering the modified second sound scene based at least in part upon the other sound content provided with the alert application is performed via earphones and the other sound content has been captured at multiple locations externally to the earphones, wherein the other sound content provided with the alert application is rendered to the user via the earphones from a direction corresponding to a direction of a source of the other sound content, external to the earphones; or wherein rendering the modified second sound scene based at least in part upon the other sound content provided with the alert application comprises rendering the other sound content provided with the alert application at a default position.

6. The method as claimed in claim 1, comprising:

determining, with an alert application, a respective priority for multiple local events, where the multiple local events are in the environment around the user, the multiple local events being independent of the content-rendering application, when a first one of the multiple local events is of sufficient priority based at least in part on a comparison of the priority for the first event with a threshold and a higher priority than a second one of the multiple local events, automatically modifying the rendered first media scene to render the modified second media scene based at least in part upon the media content provided with the content-rendering application and at least in part upon media content associated with the first higher priority event but not the second lower priority event, and when the second one of the multiple local events is of sufficient priority based at least in part on a comparison of the priority for the second event with the threshold, after rendering the modified second media scene based at least in part upon the media content associated with the first higher priority event, automatically modifying the rendered first media scene to render the modified second media scene based at least in part upon the media content provided with the content-rendering application and at least in part upon media content associated with the second lower priority event but not the first higher priority event.

7. The method as claimed in claim 1, further comprising:

determining a respective priority for multiple contemporaneous local events; and wherein automatically modifying the rendered first media scene to render the modified second media scene comprises one of:

rendering the multiple contemporaneous local events sequentially one at a time in a priority order at a same position, or rendering the multiple contemporaneous local events substantially simultaneously at different positions.

8. An apparatus comprising at least one processor and at least one non-transitory memory including computer program code, the at least one memory and the computer program code configured to, with the at least one processor, cause the apparatus at least to perform:

render a first media scene based upon media content provided with a content-rendering application via one or more rendering devices configured to be worn by a user;

determine a priority for a local event that occurs near the user, where the local event is in an environment around the user, the local event being independent of the content-rendering application; and automatically modify the rendered first media scene to render a modified second media scene based at least in part upon the media content provided with the content-rendering application and at least in part upon other media content associated with the local event.

9. The apparatus as claimed in claim 8, wherein when the local event becomes of sufficient priority based at least in part on a comparison of the priority for the local event with a threshold, determine to immediately, in real-time, automatically modify the rendered first media scene to render the modified second media scene based at least in part upon the media content provided with the content-rendering application and at least in part upon the other media content associated with the local event.

10. The apparatus as claimed in claim 8, wherein the at least one memory and the computer program code are configured to, with the at least one processor, cause the apparatus to perform:

determine the priority of the local event relative to the media content provided with the content-rendering application.

11. The apparatus as claimed in claim 8, wherein the at least one memory and the computer program code are configured to, with the at least one processor, cause the apparatus to perform:

determine the priority of the local event based on at least one user-defined criterion.

12. The apparatus as claimed in claim 8, wherein the rendering is performed via a head mounted device configured to be worn by the user and the local event relates to media content captured externally to the head mounted device or wherein the local event comprises a notification.

13. The apparatus as claimed in claim 8, wherein the at least one memory and the computer program code are configured to, with the at least one processor, cause the apparatus to perform:

when rendering the modified second media scene, maintain at least some media objects of the first media scene, as rendered in the first media scene.

14. The apparatus as claimed in claim 8, wherein the at least one memory and the computer program code are configured to, with the at least one processor, cause the apparatus to perform:

determine, with an alert application, the priority for the local event that occurs near the user, where the local event is in the environment around the user, the local event being independent of the content-rendering application;

when the local event is of insufficient priority based at least in part on a comparison of the priority for the local event with a threshold, determine to automatically continue to render the first media scene based upon the media content provided with the content-rendering application and not based upon media content provided with the alert application; and when the local event is of sufficient priority based at least in part on the comparison of the priority for the local event with the threshold, determine to automatically modify the rendered first media scene to render the modified second media scene based at least in part upon the media content provided with the content-rendering application and at least in part upon the other media content associated with the local event provided with the alert application for alerting the user to the local event.

15. The apparatus as claimed in claim 8, wherein the rendered first media scene based upon the media content comprises a first sound scene based upon sound content, and wherein rendering a modified second sound scene based at least in part upon other sound content provided with an alert application comprises rendering the other sound content provided with the alert application at a position dependent upon the other sound content; or wherein rendering the modified second sound scene based at least in part upon the other sound content provided with the alert application is performed via earphones and the other sound content has been captured at multiple locations externally to the earphones, wherein the other sound content provided with the alert application is rendered to the user via the earphones from a direction corresponding to a direction of a source of the other sound content, external to the earphones; or wherein rendering the modified second sound scene based at least in part upon the other sound content provided with the alert application comprises rendering the sound content provided with the alert application at a default position.

16. The apparatus as claimed in claim 8, wherein the rendered first media scene based upon the media content comprises a first sound scene based upon sound content, and wherein one or more sound objects present in the sound content provided with the content-rendering application and rendered in the first sound scene are muted or are not rendered in the modified second sound scene.

17. The apparatus as claimed in claim 8, wherein the rendered first media scene based upon the media content comprises a first visual scene based upon visual content.

18. The apparatus as claimed in claim 8, wherein the at least one memory and the computer program code are configured to, with the at least one processor, cause the apparatus to perform:

determine, with an alert application, a respective priority for multiple local events, where the local event is in the environment around the user, the multiple local events being independent of the content-rendering application, when a first one of the multiple local events is of sufficient priority based at least in part on a comparison of the priority for the first event with a threshold and a higher priority than a second one of the multiple local events, automatically modify the rendered first media scene to render the modified second media scene based at least in part upon the media content provided with the content-rendering application and at least in part upon media content associated with the first higher priority event but not the second lower priority event, and when the second one of the multiple local events is of sufficient priority based at least in part on a comparison of the priority for the second event with the threshold, after rendering the modified second media scene based at least in part upon the media content associated with the first higher priority event, automatically modify the rendered first media scene to render the modified second media scene based at least in part upon the media content provided with the content-rendering application and at least in part upon media content associated with the second lower priority event but not the first higher priority event.

19. The apparatus as claimed in claim 8, wherein the at least one memory and the computer program code are configured to, with the at least one processor, cause the apparatus to perform:

determine a respective priority for multiple contemporaneous local events; and wherein automatically modifying the rendered first media scene to render the modified second media scene comprises one of:

rendering the multiple contemporaneous local events sequentially one at a time in a priority order at a same position, or rendering the multiple contemporaneous local events substantially simultaneously at different positions.

20. A non-transitory computer readable medium comprising program instructions for causing an apparatus to perform at least the following:

rendering a first media scene based upon media content provided with a content-rendering application via one or more rendering devices configured to be worn by a user;

determining a priority for a local event that occurs near the user, where the local event is in an environment around the user, the local event being independent of the content-rendering application; and automatically determining to cause modification of the rendered first media scene to render a modified second media scene based at least in part upon the media content provided with the content-rendering application and at least in part upon other media content associated with the local event.

* * * * *